United States Patent
Rumsey et al.

(10) Patent No.: US 7,979,813 B2
(45) Date of Patent: Jul. 12, 2011

(54) CHIP-SCALE PACKAGE CONVERSION TECHNIQUE FOR DIES

(75) Inventors: Robert Rumsey, Saratoga, CA (US); Richard Dolan, Pleasanton, CA (US); Haowei Wu, San Jose, CA (US)

(73) Assignee: Micrel, Inc., San Jose, CA (US)

( * ) Notice: Subject to any disclaimer, the term of this patent is extended or adjusted under 35 U.S.C. 154(b) by 325 days.

(21) Appl. No.: 12/354,703

(22) Filed: Jan. 15, 2009

(65) Prior Publication Data

US 2010/0180249 A1  Jul. 15, 2010

(51) Int. Cl.
G06F 17/50 (2006.01)
G06F 19/00 (2011.01)
H01L 21/00 (2006.01)

(52) U.S. Cl. ............ 716/54; 716/55; 716/119; 716/137; 716/138; 700/98; 700/120; 700/121; 438/107; 438/123; 257/E33.056

(58) Field of Classification Search ............ 716/15, 716/21, 54, 55.119, 137, 138; 700/98, 120, 700/121; 438/107, 123; 257/E33.056, E33.057, 257/E33.058, E33.059
See application file for complete search history.

(56) References Cited

U.S. PATENT DOCUMENTS

| 6,781,248 | B2 * | 8/2004 | Hui et al. ............... 257/787 |
| 6,984,544 | B2 * | 1/2006 | Cloud et al. ............ 438/107 |
| 2002/0006686 | A1 * | 1/2002 | Cloud et al. ............ 438/109 |
| 2002/0074652 | A1 * | 6/2002 | Pierce ...................... 257/724 |
| 2009/0311829 | A1 * | 12/2009 | Yang et al. ............. 438/109 |

FOREIGN PATENT DOCUMENTS

JP  2007134394 A  *  5/2007

* cited by examiner

*Primary Examiner* — Phallaka Kik
(74) *Attorney, Agent, or Firm* — Patent Law Group LLP

(57) ABSTRACT

A method is described for converting an existing die, originally designed for a non-chip-scale package, to a chip-scale package die, where the die's bonding pads are located in positions within a defined grid of candidate positions. In the first step, the die's layout, comprising its outer boundaries and areas needed to be electrically connected to bonding pads, are shifted relative to a grid of candidate positions for the bonding pads until an optimal alignment is identified. Bonding pads positions on the die are then selected corresponding to optimum grid positions within the outer boundaries of the die. The die is then fabricated using the original masks to form at least the semiconductor regions and using a new set of masks for defining the new locations of the bonding pads for the chip-scale package. The chip-scale package is then bonded to a PCB using chip-scale package technology.

12 Claims, 4 Drawing Sheets

CHIP-SCALE PACKAGE CONVERSION TECHNIQUE FOR DIES

FIELD OF THE INVENTION

This invention relates to integrated circuit fabrication and, in particular, to designing a bonding pad arrangement on a die conforming to standards for chip-scale packaging.

BACKGROUND

One type of conventional integrated circuit (IC) package contains an IC, where bonding pads on the IC are generally along its periphery. The bonding pads are connected to a leadframe using wire bonding, and the IC and leadframe are sealed within a plastic or ceramic body. Leads from the leadframe extend from edges of the body and are either soldered to pads of a printed circuit board (PCB) or the leads are pushed into a socket.

A relatively recent trend in IC packaging is called chip-scale packaging. In chip-scale packaging, the IC's bonding pads align with ball sites in a standard ball grid array. The ball site pitch is typically 0.3 mm or 0.5 mm. The IC pads are directly bonded to pads on a PCB, with the substrate of the IC facing upward, so no leadframe is needed. The IC pads are bonded to PCB pads either through ultrasonic welding or solder (using solder balls). In chip-scale packaging, since there is no leadframe, the footprint of the IC on the PCB is a minimum. In this way, the PCB may be very densely packed with ICs, which is desirable in compact applications such as cell phones.

Such chip-scale packaging also simplifies the customer's assembly requirements since all ICs have pads that align with locations on a single type of grid. The PCB contains interconnections between the PCB pads and connects certain pads to PCB connectors.

There are many ICs specifically designed for connection to a leadframes. It would be desirable to convert such existing IC designs to a chip-scale package without a major redesign of the chip and without adversely affecting the performance of the IC.

SUMMARY

In one embodiment of the invention, any IC design can be adapted to a chip-scale design without any change to the masks that created the circuitry. Using the present invention, only the metal masks need to be changed for the conversion.

Since the die was originally designed for other than a chip-scale package, the layout of the circuitry was optimized for the original packaging. This may mean that the design avoided metal terminals over certain areas of the chip to preclude parasitic capacitances, or that semiconductor contact regions occurred along the edges of the die for alignment with the leadframe, or the layout had other characteristics optimized for the original packaging.

Assuming the silicon substrate of the die is considered the "bottom" of the die, a standard grid of ball sites (a ball-site frame) that will be used by the customer's PCB is laid over (in software) a plot of the original die so it can be determined how the possible ball sites align with the die's semiconductor regions and other circuitry. The ball site frame is then effectively shifted to a location over the die that is optimal for the particular layout of the existing die circuitry. (This is equivalent to shifting the die relative to the ball site frame.) Certain grid locations are then identified in the ball-site frame that define the locations of the die's new bonding pads. The optimized location of the ball-site frame over the die is determined using either a software program or by human analysis. The number of ball sites at least partially covering the die must be at least the number of terminals required for proper operation of the die.

In a simplified example, the die may need four bonding pads that must be aligned with four locations in a standardized grid on the customer's (assembler's) PCB. The die may have sensitive circuitry that should not have any nearby metal connectors to avoid interference or parasitic capacitances. Many other concerns may apply to the locations of the pads, and such criteria may be preprogrammed or be understood by the package designer. The ball-site frame corresponds to the customer's intended PCB grid, and the ball site frame is effectively shifted over the die to determine an optimal location of the frame relative to the die. Therefore, at this point, the optimal four ball sites in the frame covering the die are identified as the locations of the die's pads.

Once the pad sites are identified, the required metal patterns on the die are determined such that conductors on the die contact the necessary semiconductor regions and terminate in pads aligned with the identified pad sites. The metal patterns may use the original metal 1 mask of the die that defines metal contacts to the semiconductor regions. A new mask is created for one or more additional metal layers that create the bonding pads and any routing layer that connects the bonding pads to the metal 1 layer. The number of metal masks depends on the simplicity of the IC. In some cases, an IC may have two pads (e.g., a diode), three pads (e.g., a linear regulator), or many more pads for more complex circuits.

BRIEF DESCRIPTION OF THE DRAWINGS

Elements in the various figures labeled with the same numeral may be identical.

DETAILED DESCRIPTION

Figure 1:
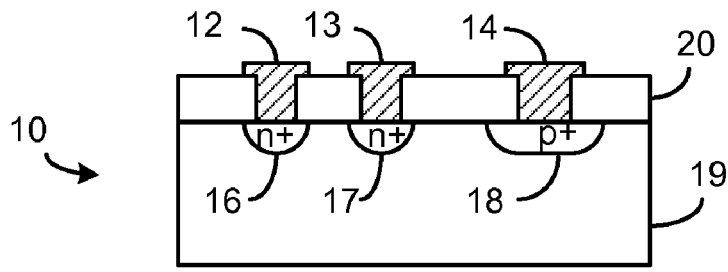
FIG. 1 is a cross-section of a simplified prior art IC having three metal terminals for bonding to a leadframe, where the cross-section cuts across three semiconductor regions.

A simplified IC will be used in an example of converting an existing die design to a chip-scale package. FIG. 1 is a cross-section of a prior art IC 10 having three metal terminals 12-14, where the cross-section cuts across three semiconductor regions 16 (n+), 17 (n+), and 18 (p+) that are connected to the terminals. The regions 16-18 are formed in a silicon substrate 19. There may be much more complex circuitry formed on the IC, but only the portions relevant to the connections and the sensitive circuitry areas need to be shown. Various masks are used to form the semiconductor regions 16-17 by doping and other processes. A patterned oxide layer 20 is used for defining the areas where metal contacts the regions 16-18. It is assumed that the original design of the IC was created for a conventional package, such as where small wires are bonded between the terminals 16-18 and a leadframe, and the structure is encased in a plastic or ceramic body to form a surface-mounted package or a dual in-line package.

Figure 2:
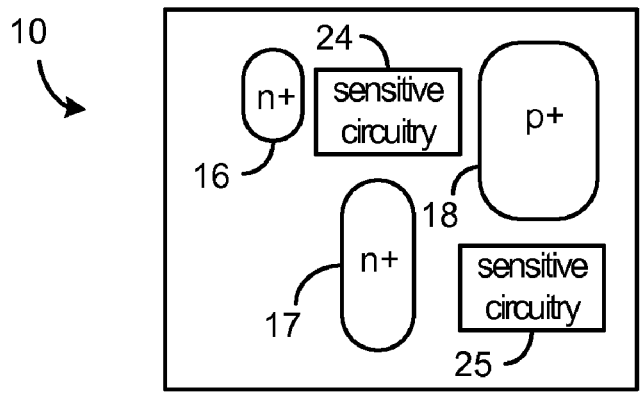
FIG. 2 is a top view of the IC of FIG. 1, without the original terminals, which will be converted to a chip-scale package and mounted face down on a PCB.

FIG. 2 is a top view of the IC of FIG. 1 only showing the regions 16-18 and the locations of sensitive circuitry 24 and 25. Sensitive circuitry may be circuitry that is sensitive to parasitic capacitances or has other characteristics that require there be no terminal near the sensitive circuitry.

In one embodiment, the simple IC 10 is about 2 mm across.

Figure 3:
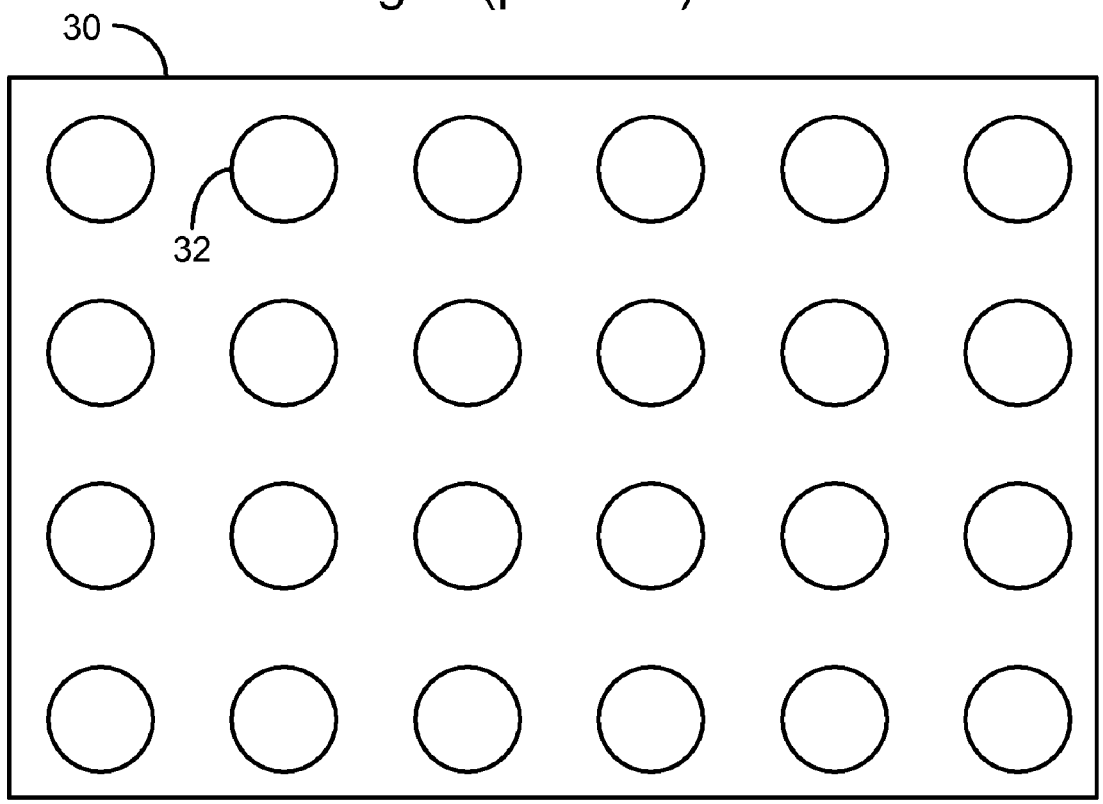
FIG. 3 represents a ball-site frame, existing in software or physically, that is used to position the IC of FIG. 2 relative to candidate ball sites on a PCB.

FIG. 3 illustrates a ball-site frame 30 that is represented in software. In other embodiments, the frame 30 may be shown on a display or may be a plot on paper. Performing the chip-scale package conversion totally in software is preferred for complex circuits.

Each position (ball sites 32) in the frame represents a candidate ball site in a standardized grid, where the standardized grid is also used in a PCB on which the IC is to be mounted. Standard grid pitches include 0.3 mm and 0.5 mm. The pitch represented in FIG. 3 is 0.5 mm. The pads on the PCB are located within the grid positions, which requires the pads on the chip-scale packages to also be located within the grid positions.

In order to design the PCB, the customer needs to know the locations of the pads on each IC, which may be identified in the IC data sheet. The customer will design the PCB to interconnect the various ball site pads on the PCB with other pads and connect the ball site pads to connectors on the PCB. Such connections are done with metal traces, in one or more layers, in or on the PCB using conventional techniques. An automatic pick and place arm will place each IC on the PCB in its predetermined location and ultrasonically weld the IC pads to the corresponding pads on the PCB, or the IC pads may be soldered to the corresponding PCB pads using solder balls. This greatly eases the design of the PCB and minimizes the size of the PCB.

The IC 10 design would normally have been performed using a CAD program, and the conventional CAD program can be controlled to create a layout of the semiconductor regions and contact areas of the IC 10. The contact areas identify where metal directly contacts semiconductor regions for connection to the IC pads. With respect to the IC 10 of FIGS. 1 and 2, the contact areas are within the regions 16, 17, and 18.

Figure 4:
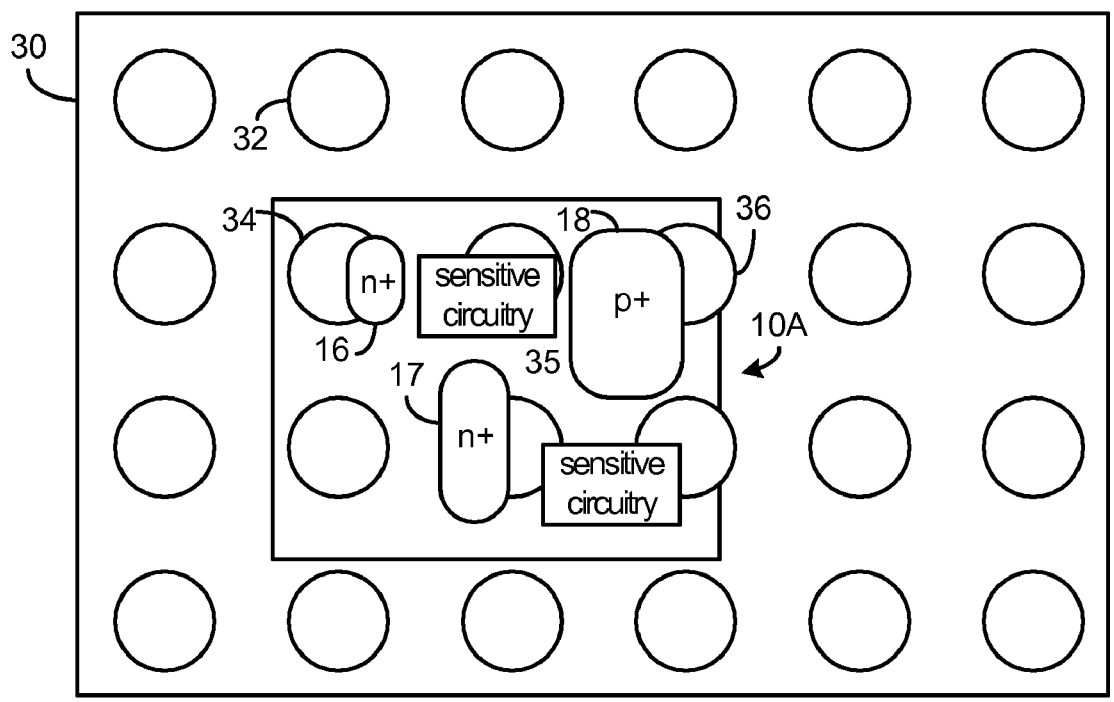
FIG. 4 illustrates the IC of FIG. 2 positioned at an optimal location relative to ball sites on the frame.

As shown in FIG. 4, the user of the present invention effectively positions the IC layout (either visually or automatically pursuant to a computer program) relative to the ball sites 32 to identify optimal locations of pads on the IC that will bond to ball sites on the PCB. If the positioning is done manually, the frame may be transparent with the ball sites in outline, and the frame may be moved over the IC layout to identify optimal locations for the pads.

An optimal placement of pads may result in the pads being generally aligned with the semiconductor regions to be contacted to minimize routing complexity and conductor length; however, this may not be possible since a candidate ball site may not align with the semiconductor region to be contacted. Ball sites that align with sensitive circuitry 24 and 25 should not be used.

FIG. 4 illustrates a desired location of the IC relative to the frame 30, and ball sites 34, 35, and 36 are identified as the optimum locations for pads that connect to semiconductor regions 16-18, respectively. Ideally, the outer boundary of the IC is completely within the frame 30 to maximize the area for potential pad sites. The IC positioned with respect to the frame is a layout 10A of the IC 10 represented in a software file. The scales of the layout 10A and the ball sites 32 must be the same, but the absolute sizes of the representations, if displayed, are not relevant. The selected ball sites do not have to overlap the semiconductor regions, since a metal routing layer can laterally connect any pad to any metal contact. As long as a portion of a ball site is within the boundaries of the die, a bonding pad can be located on the die to contact a corresponding ball site on a PCB.

In a preferred embodiment, a computer program contains selection criteria for the ball sites and is programmed with information about the IC to be adapted, such as the locations of the semiconductor contact areas and the sensitive circuitry areas of the IC. The program may start by determining if there is a candidate ball site directly aligned with the semiconductor region to be contacted. If not, the program identifies the closest ball site that is not over any sensitive circuitry. Writing such a computer program may be performed by one of ordinary skill in the art without undue experimentation.

Figure 5:
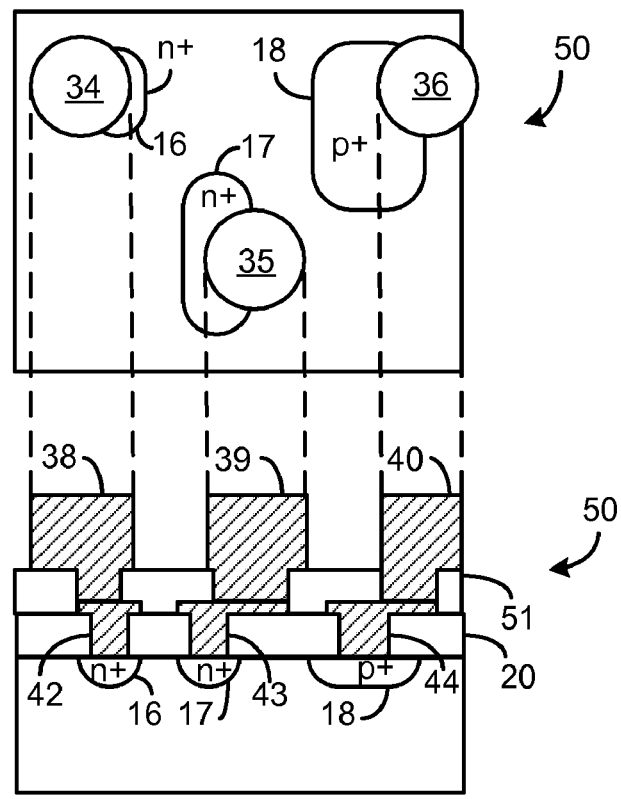
FIG. 5 illustrates the resulting three ball sites selected in FIG. 4 and the new bonding pads formed on the original die corresponding to the selected ball sites in the frame.

FIG. 5 shows the result of the ball site selection process, identifying the locations of the metal bonding pads 38-40 on the resulting IC 50 corresponding to ball sites 34-36, respectively. FIG. 5 also shows how the pads 34-36 are connected to the semiconductor regions using a first metal layer forming contacts 42-44. Contacts 42-44 may be formed of a metal that is conventionally used as an intermediate metal between a semiconductor and aluminum. The pads 38-40 may be plated with gold or other conventional pad material.

The metal layers are defined using masks, such as a chrome pattern on a glass plate. During the manufacturing of the chip-scale package IC 50, all original masks for forming the semiconductor regions, the metal contacts, and any metal interconnections between the regions may be used. However, at least the original metal mask that is used for forming the bonding pads/terminals is not used. Instead, a new pad mask and any routing/interconnect mask is used to form the pads 38-40 and any routing metal for connecting the contacts 42-44 to the pads 38-40. There may be a plurality of routing layers if needed. Masks that define openings in an oxide layer (e.g., oxide 20 and 51), for contacting semiconductor regions or metal layers, and masks that are used to pattern (etch) metal layers are candidates for replacement in the inventive process. In FIG. 5, only a simple extension of the metal contacts 43 and 44 is used to laterally connect to the associated pads 39 and 40. The ICs 50 are formed on a wafer, and the wafer is then diced to separate out the individual ICs.

Figure 6:
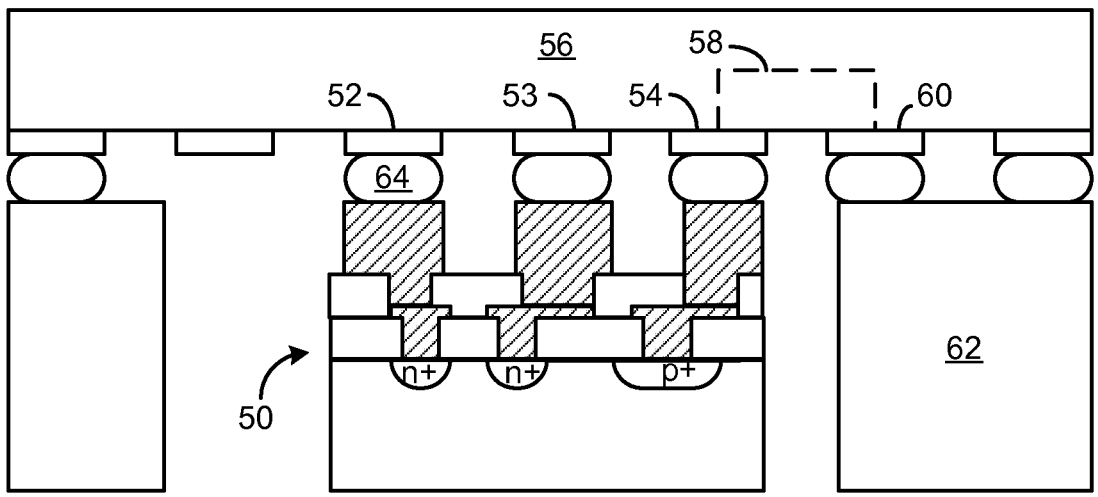
FIG. 6 illustrates the IC of FIG. 5 ultrasonically welded to pads on a PCB, where the PCB pads are located within a standardized grid matching that of the frame of FIG. 4.

FIG. 6 illustrates IC 50 being bonded to the pads 52-54 on a PCB 56, where the pads 52-54 correspond to certain grid locations (e.g., 0.5 mm pitch) in the frame 30 of FIG. 4. One interconnection 58 on or in the PCB 56 is shown to illustrate that the PCB 56 contains interconnections for connecting pads 52-54 to other pads (e.g., pad 60 connected to IC 62) or to connectors for the PCB. Metal balls 64 are shown as the bonding material between pads, if needed. Balls 64 may be solder balls or balls for ultrasonically welding pads to each other. The PCB 56 may have a polymer layer with holes (not shown for simplicity) exposing the pads (e.g., 52-54) for assisting in the bonding process and for preventing shorts between balls 64.

Figure 7:
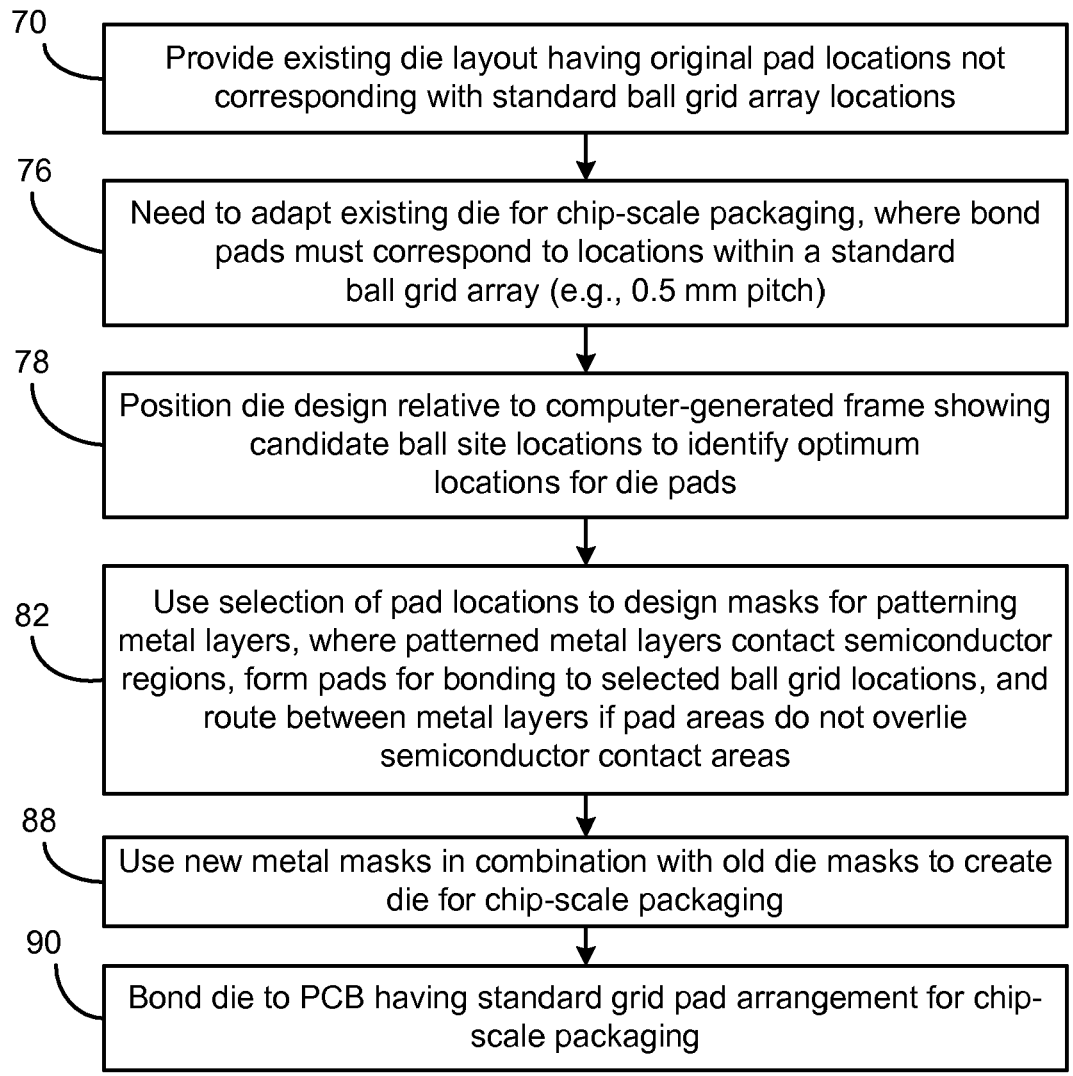
FIG. 7 is a flowchart of various steps used in one embodiment of the invention.
Figure 8:
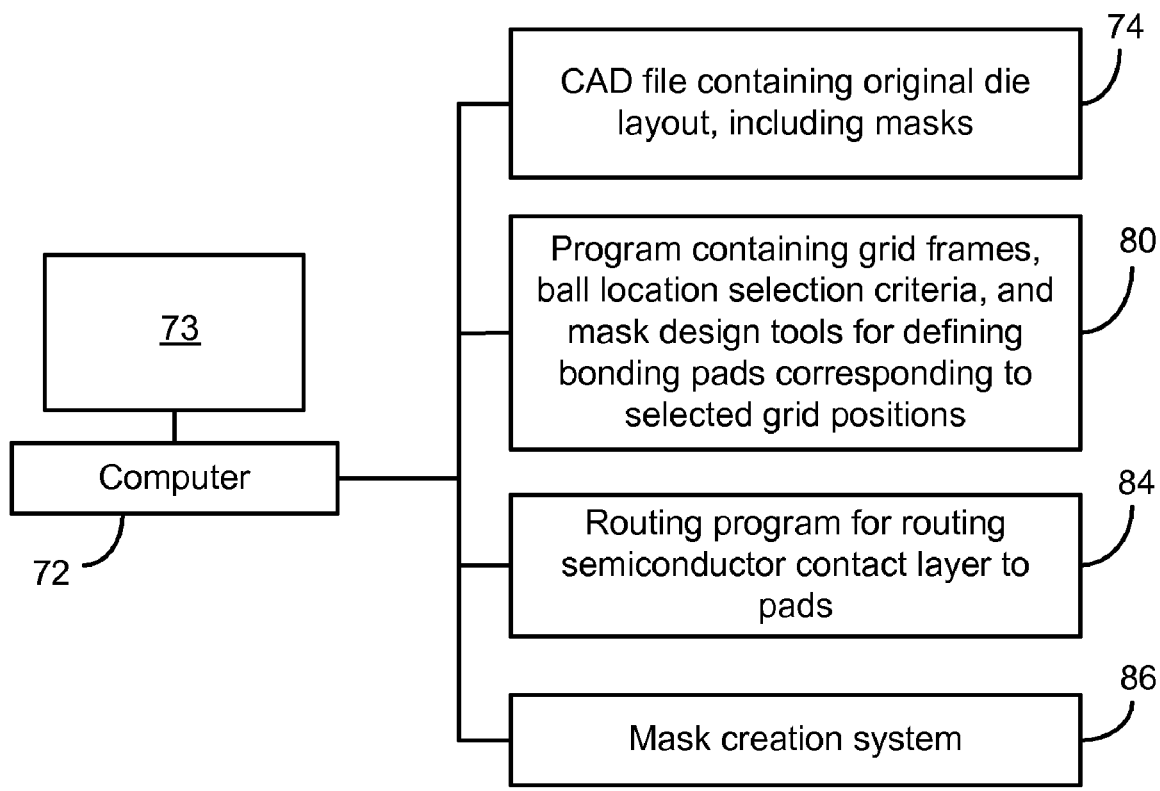
FIG. 8 illustrates a computer system and program files used to carry out the invention.

FIG. 7 is a flowchart of various steps used in one embodiment of the invention, and FIG. 8 illustrates a computer system that may be used to carry out the process.

In step 70 of FIG. 7, an existing die layout is provided, such as stored in a CAD file for the original IC. The conventional die layout identifies the various masks used to fabricate the original IC. The original IC had bonding pad locations that would not have corresponded with standard ball grid array locations, since the original IC was intended for a non-chip-scale package. Any of the original masks can be easily accessed using conventional CAD tools. In a simple example, the relevant masks are those which define where the semiconductor regions are contacted for connection to bond pads and those that are used to form the original pads, since those masks will be replaced. FIG. 8 illustrates a standard computer 72 and monitor 73, where the computer 72 processes a CAD file 74 containing the original die masks, including the masks for patterning the metal layers.

In step 76, the need is identified for adapting the original die design for chip-scale packaging, where bond pads on the die must correspond to ball sites in a standard grid array used by the customer (assembler).

In step 78, a program identifying a ball site frame (or grid frame) is accessed by the computer 72. The program may contain criteria for selecting a position of the die (using the die layout) relative to the frame to identify optimum locations of candidate ball sites in the frame for connection to corresponding pads on the die. The optimum locations would typically be as near as possible to the semiconductor regions electrically contacted by the pads yet will not be aligned with any sensitive circuitry to avoid interference with the operation of the die. Such a program is identified as the program 80 in FIG. 8.

In step 82, the program 80 uses the selection of the pad locations to design masks for patterning metal layers on the die and any oxide layers, where the patterned layers may define the contacts to the semiconductor regions, form bonding pads on the die corresponding to the selected ball sites, and define a metal routing layer to interconnect the contacts to the pads if the pad areas do not overlie the semiconductor contact areas. A separate routing program 84 may be used to determine optimum routing between the semiconductor contacts and the pads for complex chip designs.

The mask designs are then applied to a mask creation system 86 that creates the physical masks (chrome on glass substrate) for defining the metal layers.

In step 88, the original die masks are used to form the various semiconductor regions and any metal layers that have not changed, and the new masks are used to form the die pads and any other metal layers needed for chip-scale packaging.

In step 90, the assembler then bonds the die to a PCB, where the PCB has bonding pads corresponding to the locations of the pads on the die, where the pads are only located at positions in a standard grid defined by the assembler.

The die may be encapsulated on all sides for protection against humidity, etc. Preferably, the size of the encapsulated chip-scale package is less than 1.2 times the size of the semiconductor die.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A method for forming an integrated circuit die having bonding pads that are located in positions within a defined grid of candidate positions to form a chip-scale package, the method comprising:

providing a die layout, the die layout identifying outer boundaries of the die and areas needed to be electrically connected to bonding pads, the die layout being originally created for other than a chip-scale package, the die using a first set of masks to define all semiconductor regions in the die;

providing a grid of candidate positions for the bonding pads;

selecting an alignment of the outer boundaries of the die with respect to the grid of candidate positions and identifying positions within the grid of candidate positions for forming bonding pads on the die, where at least portions of the identified positions are within the outer boundaries of the die;

producing at least one second mask for patterning the bonding pads on the die corresponding to identified positions within the grid of candidate positions; and fabricating the die using at least the first set of masks, to define all semiconductor regions in the die, and using the at least one second mask, to define the bonding pads, to create a chip-scale package.

2. The method of claim 1 wherein the step of identifying positions within the grid of candidate positions comprises identifying positions within the grid of candidate positions such that the bonding pads will not adversely affect performance of the die.

3. The method of claim 1 wherein the step of identifying positions within the grid of candidate positions comprises identifying positions within the grid of candidate positions by a program applying selection criteria.

4. The method of claim 1 wherein the die layout was originally created for the die to be connected to a leadframe.

5. The method of claim 1 wherein the at least one second mask comprises a third mask for patterning a metal layer that directly contacts semiconductor regions in the die.

6. The method of claim 1 wherein the at least one second mask comprises a third mask for patterning a metal layer that interconnects the bonding pads to a metal layer electrically connected to semiconductor regions in the die.

7. The method of claim 1 wherein providing a die layout comprises providing a computer aided design (CAD) file identifying the die layout.

8. The method of claim 1 wherein selecting an alignment of the outer boundaries of the die with respect to the grid of candidate positions comprises shifting the outer boundaries of the die relative to the grid until a desired alignment is selected.

9. The method of claim 1 wherein positions within the grid of candidate positions for the bonding pads represent a pitch of about 0.5 mm or less.

10. The method of claim 1 further comprising bonding the die's bonding pads to pads on a printed circuit board (PCB), where the pads on the PCB are within the same grid of candidate positions used during the step of providing a grid of candidate positions for the bonding pads.

11. The method of claim 1 wherein the grid of candidate positions for the die's bonding pads correspond to candidate pad positions on a printed circuit board (PCB) on which the die is to be mounted.

12. A computer system programmed to identify bonding pad locations on an integrated circuit die, where the bonding pads are to be located in positions within a defined grid of candidate positions to form a chip-scale package, the computer system being programmed to carry out the process comprising:

receiving a die layout, the die layout identifying outer boundaries of the die and areas needed to be electrically connected to bonding pads, the die layout being originally created for other than a chip-scale package, the die using a first set of masks to define all semiconductor regions in the die;

providing a grid of candidate positions for the bonding pads;

selecting an alignment of the outer boundaries of the die with respect to the grid of candidate positions and identifying positions within the grid of candidate positions for forming bonding pads on the die, where at least portions of the identified positions are within the outer boundaries of the die; and designing at least one second mask for patterning the bonding pads on the die corresponding to identified positions within the grid of candidate positions, such that the die is fabricated using at least the first set of masks, to define all semiconductor regions in the die, and using the at least one second mask, to define the bonding pads, to create a chip-scale package.

* * * * *